Dec. 29, 1964   O. A. KINZIE ETAL   3,163,035
APPARATUS FOR PRESSURE TESTING FITTINGS
Filed Feb. 23, 1961   2 Sheets-Sheet 1

INVENTORS
ORA A. KINZIE
HUBERT J. WATTS
BY *William J. Miller*
ATTORNEY

Dec. 29, 1964  O. A. KINZIE ETAL  3,163,035
APPARATUS FOR PRESSURE TESTING FITTINGS
Filed Feb. 23, 1961  2 Sheets-Sheet 2

INVENTORS
ORA A. KINZIE
HUBERT J. WATTS
BY
ATTORNEY

United States Patent Office 3,163,035
Patented Dec. 29, 1964

3,163,035
APPARATUS FOR PRESSURE TESTING FITTINGS
Ora A. Kinzie and Hubert J. Watts, Ponca City, Okla., assignors to Continental Oil Company, Ponca City, Okla., a corporation of Delaware
Filed Feb. 23, 1961, Ser. No. 91,019
1 Claim. (Cl. 73—49.8)

The present invention relates to apparatus for testing fluid fittings such as valves, gauges and relief valves by internally applied fluid pressure, and, more particularly, relates to such a device having means for quickly connecting the fitting to a source of fluid under pressure.

After the manufacture of most fluid fittings, it is desirable to pressure test each fitting to insure that it will function properly. For example, a valve must be tested against leaks at its rated pressure. Gauges must be calibrated for accuracy. Pressure relief valves must be adjusted to release at a rated pressure. In oil refineries, many valves, gauges and relief valves are relied upon for the safe and efficient operation of the refinery. Each fitting must be periodically tested to insure safe operation. Heretofore, each fitting was connected to a source of test fluid by the same coupling used to connect the fitting in normal operation. For example, a flanged fitting was bolted by several bolts to a similar flange on the test fluid conduit. Much time and effort was required to connect, run the test, and disconnect each fitting.

In accordance with the present invention, a piston member is slidably received in a cylinder member to form a fluid motor. One of the members is connected to a support structure so that the other is then moved away from the structure by fluid in the motor. A seating surface is positioned adjacent one end of one of the members and faces away from the members. Hook means is connected to the member remote from the seating surface and extends beyond the seating surface to engage and clamp a fitting against the seating surface when fluid is introduced to the motor. Conduit means is provided to introduce test fluid to the fittings through an orifice in the seating surface.

An important object of the present invention is to provide an apparatus for quickly and easily connecting a fluid fitting to a source of test fluid for pressure testing the fitting.

Another object of the present invention is to provide apparatus of the type described which operates by fluid pressure and therefore requires a minimum of physical effort.

Another object of the present invention is to provide a single apparatus of the type described which will test fittings of widely varying size.

Another object of the present invention is to provide apparatus of the type described which will automatically adjust to irregularities in construction of the fittings and placement of the fittings on the seating surface and insure a fluid-tight seal between the fitting and the source of test fluid.

Another object of the present invention is to provide apparatus of the type described which is compact, relatively lightweight, has a minimum of high strength material parts and is, therefore, easily and economically constructed.

Another object of the present invention is to provide apparatus of the type described wherein the fitting to be tested is placed on an upwardly facing seating surface which remains stationary and is clamped in position.

Additional objects and advantages will be obvious to those skilled in the art from the following detailed description and drawings wherein.

Figure 1:
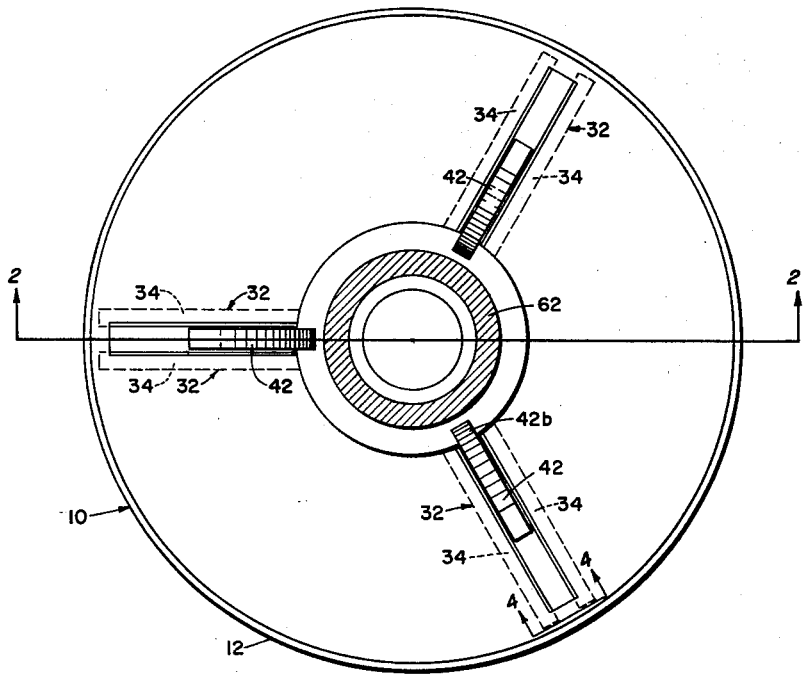
FIGURE 1 is a top view of a device constructed in accordance with the present invention with a fitting to be tested shown in place and in cross section.

Referring now to the drawings, the apparatus for connecting a fitting to a source of test fluid is indicated generally by reference numeral 10. A housing is comprised of cylindrical wall portion 12, a flat bottom portion 14 and a generally flat top portion 16. A support plate 18 is disposed intermediate the top 16 and bottom 14 and is securely fastened to the cylindrical wall 12.

A piston member indicated generally at 20 has a tubular piston rod portion 20a and a piston portion 20b of greater diameter than the rod portion 20a. This construction provides a double-faced piston having faces 20c and 20d. The piston member has a spherically convex end 20e opposite the piston 20b. An appropriate piston ring 22 is provided on the piston 20b.

A cylinder member indicated generally by the number 24 slidably receives the piston member 20 in fluid sealing engagement by reason of the piston ring 22 to form a fluid motor. The cylinder member 24 has a cup shaped lower portion comprised of a tubular portion 24a closed by a head portion 24b. A flat plate 24c receives the rod portion 20a of the piston member in close fitting, sliding engagement and is connected to the tubular portion 24a by screws 24d. A suitable sealing ring 28 is provided to form a fluid-tight slidable seal between the plate 24c and the rod portion 20a. A fluid inlet-outlet with a threaded tap 30 is provided to introduce fluid above the piston portion 20b and a similar fluid inlet-outlet with a threaded tap 31 is provided to introduce fluid to the cylinder below the piston portion 20b.

Figure 4:
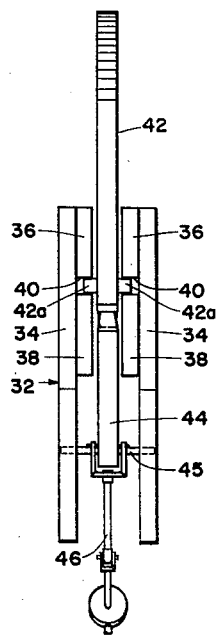
FIGURE 4 is a side view taken generally on lines 4—4 of FIG. 1 and showing details of construction of a portion of the device of FIG. 1.

Three hook means indicated generally by the reference numeral 32, one of which is shown in FIG. 4, are circumferentially spaced around and connected to the cylinder member 24. Each hook means 32 is comprised of a pair of parallel plates 34 disposed in parallel relationship, each pair extending radially from the axis of the cylinder member 24 and the piston member 20, and securely connected to the cylinder member 24. A pair of spaced-apart plates 36 and 38 are securely connected to the inner face of each of the plates 34. The plates 36 and 38 are so connected to the plates 34 as to form a pair of parallel grooves 40 extending radially from and substantially perpendicular to the axis of the cylinder member 24.

An elongated hook member 42 is slidably disposed between the plates 36 and 38. The hook member 42 has a pair of elongated ribs 42a which are received in the grooves 40. The hook 42 also has, at the other end, a portion 42b which extends radially inwardly toward the axis of the cylinder member 24. A gear rack 42c is connected to the bottom of the hook member 42 and extends generally parallel to the ribs 42a. A gear segment 44 is pivotally mounted on an axle 45 supported by the parallel plates 34 in a position to mesh with the gear rack 42c. A lever arm 46 is rigidly connected to the gear segment 44. A double-acting fluid motor 48 is pivotally connected by a pin 50 to a support bracket 51 connected to the cylinder member 24. The rod 48a of the motor 48 is pivotally connected by a pin 52 to the lever arm 46. From the foregoing, it will be obvious that operation of the fluid motor 48 will pivot the gear segment 44, and, by means of the gear rack 42c, will move the hook member 42 in each direction along the guide grooves 40, which is radially with respect to the cylinder member 24.

In the preferred embodiment, the piston member 20 is connected to the support plate 18 by a ring bracket 54 having a cross section as shown. The ring is connected to the piston member in any suitable manner such as by welding, and the ring is bolted to the support plate 18 by bolts 24d to provide an easy means for assembly.

A seating surface means indicated generally at 56 is comprised of a hard metallic plate 58 having a concave spherical surface 58a in abutting and mating relationship with the convex spherical surface 20e. A plate 60, preferably fabricated of a resilient gasket material, provides a seating surface 60a which faces away from both the piston member 20 and the cylinder member 24. The construction wherein the concave spherical surface 58a rests upon the convex spherical surface 20e provides, in effect, a ball joint which will readily permit tilting of the seating surface 60a to adjust to any particular fitting 62 to insure a fluid-tight seal between the fitting 62 and the seating surface member 56. An orifice 64 in the seating member 60 communicates with a tap 66 in the plate 58 to provide a means for introducing test fluid to the fitting 62.

Figure 3:
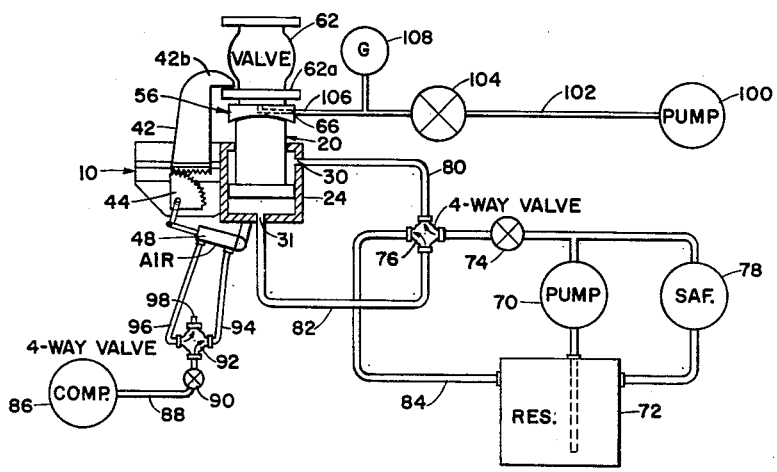
FIGURE 3 is a schematic diagram of a typical fluid circuit used in combination with the device of FIG. 1.

Referring now to FIG. 3, a fluid pump 70 takes fluid from a reservoir 72 and pumps it through a gate valve 74 to a four-way valve 76. In one position, the four-way valve 76 directs fluid from the pump 70 through conduit 80 to the tap 30 in the cylinder member 24. At the same time, the other passage in the valve 76 returns oil from the tap 31 of the cylinder member 24 through conduit 82, through the valve 76, and then through a conduit 84 back to the reservoir 72. Therefore, by moving the four-way valve 76 between its two positions, the cylinder member 24 can be made to move either upwardly or downwardly with respect to the piston 20b. A safety relief valve 78 is provided to return fluid from the pump to the reservoir whenever the valve 74 is closed or the piston member 20 and cylinder 24 are not in motion. This system preferably uses a non-compressible fluid such as hydraulic oil to insure positive operation.

A similar system is provided to operate the three hydraulic motors 48, except that a pneumatic system is preferred in this instance. A compressor 86 delivers air under pressure through conduit 88 and through valve 90 to a four-way valve 92. In one position, the valve 92 delivers air simultaneously to the head end of all three pneumatic motors 48. Air from the rod ends of the motors 48 passes through conduit 96 and vents to atmosphere through the valve 92 and conduit 98. When the valve is shifted to the alternative position, compressed air is routed through conduit 96 to the rod end of motor 48 and air passes from the head end of the motor 48 through conduit 94 and vent conduit 98. It will be understood that all three motors 48 are connected in parallel and are simultaneously operated by the same valve 92.

A third pump 100 provides test fluid under pressure for introduction into a fitting such as the valve 62. The fluid may be either hydraulic or pneumatic depending upon the fitting to be tested. Fluid is pumped from a suitable source (not shown) through conduit 102, gate valve 104 and conduit 106, which is connected to tap 66. The fluid then passes through the conduit in the seating surface means 56 and is introduced to the fitting 62 through the orifice 64 in the seating surface 60a. A pressure gauge 108 is provided to give a visual indication of the pressure within the fitting 62.

It will be appreciated that the fluid lines connected to the apparatus must be, at least in part, flexible. For example, the conduits 80 and 82, which are connected to taps 30 and 31, respectively, must have a flexible portion to permit the cylinder member 24 to move upwardly and downwardly with respect to the support structure. Similarly, the conduits 94 and 96 connected to the fluid motors 48 must be flexible because the fluid motors 48 move with the cylinder member 24. The conduit 106 should have a flexible member so that the seating surface member 56 can tilt on its ball joint type support comprised of surfaces 20e and 58a.

Operation

In order to test a fitting such as the valve 62, the valve is placed with its flange seating surface face down on the upwardly facing seating surface 60a. The four-way valve 92 is moved to the position shown in FIG. 3 to introduce compressed air through the conduits 94 to the head end of each of the three motors 48. For convenience, the operation of a single hook means 32 will be described, it being understood that all three hook means 32 have the same, simultaneous operation. The compressed air in the motor 48 moves the piston 48b toward the rod end of the motor cylinder. The lever 46 is moved away from the motor 48 and the gear segment 44 is pivoted clockwise about the pin 45. Since the gear segment 44 is in mesh with the rack gear 42c, the hook member 42 is moved radially inwardly with the ribs 42a sliding in the grooves 40. The hook member 42 is moved inwardly until the hook member strikes the flange 62a, for example, or until the hook member abuts against the cylinder member 24. The air pressure is preferably maintained on the pneumatic motors 48 to hold the hook members inwardly.

Next, the four-way valve 76 is moved to a position to direct fluid through conduit 82 and into the bottom of the cylinder member 24. As previously mentioned, fluid leaves the cylinder member from above the piston portion 20d through conduit 80, valve 76 and conduit 84 to the reservoir 72. Introduction of fluid under pressure through tap 30 moves the cylinder member 24 downwardly, which also moves the hook means 42 downwardly until the hook portion 42b engages the flange 62a of the valve and the seating face of the valve flange 62a is securely clamped against the face of the resilient gasket material 60. The hydraulic pressure is maintained in the cylinder 24 until the test is completed. Additional fluid pumped by the pump 70 is routed through the safety relief valve 78 back to the reservoir 72. The cooperation of the abutting spherical surfaces 20e and 58a on the piston member 20 and seating surface member 58, respectively, provides a means for the seating surface 60a to automatically be tilted when subjected to the force of the valve 62 being clamped tightly by the hook members 42 to insure a fluid-tight annular seal between the valve 62 and the seating surface 60a.

Figure 2:
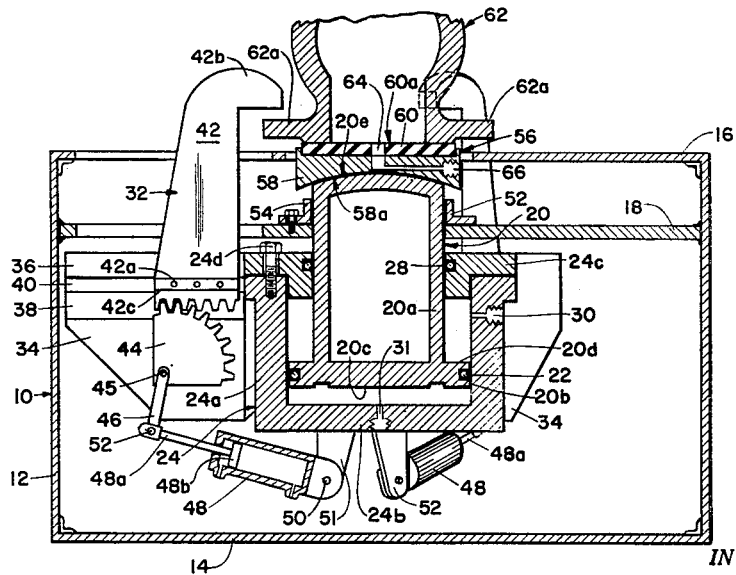
FIGURE 2 is a sectional view taken on lines 2—2 of FIG. 1.

When the test has been completed, the valve 62 is unclamped by turning four-way valve 76 to a position which will direct fluid from the pump 70 through conduit 80 to the cylinder member 24 above the piston portion 20b. The fluid then forces the cylinder member 24 upwardly which raises the hook portions 42b from the flange 62a of the valve. Next, the four-way valve 92 is shifted to the position to direct fluid through conduits 96 to the rod ends of the three motors 48. Introduction of fluid to the rod end of each motor 48 will pivot each gear segment 44 counterclockwise (referring to FIGS. 2 and 3) and will shift each hook member 42 radially outwardly from the cylinder member 24 to move the hook members 42 away from the valve 62.

From the foregoing detailed description of a preferred embodiment, it will be evident that apparatus is provided for quickly testing a fluid fitting. The device requires a minimum of physical effort and can readily be operated by one person. The apparatus can readily test a variety of fluid fittings ranging from quite small to very large in size due to the novel construction of the hook means. Due to the abutment between the piston member and the seating surface member, a minimum of high strength parts are required, resulting in an economically fabricated device. Due to the ball joint between the seating surface means and the piston member, the seating surface automatically adjusts to the seating surface on the fitting to insure a positive fluid-tight seal therebetween. The upwardly facing stationary seating surface provides a conveniently operated device.

It is to be understood that, while a preferred embodiment of the invention has been described in detail, various changes can be made without departing from the spirit and scope of the invention as defined by the appended claim.

We claim:

Apparatus for pressure testing flanged valves and the like comprising:

(a) a frame member having a top and sides;
(b) a first fluid motor means rigidly mounted transverse to the top of said frame, said motor including a cylinder member having a piston therein, said piston having a convex upper surface;
(c) a disc-shaped valve seat member having a concaved underside mounted on said piston and adapted to fit the upper convex surface of said piston;
(d) a plurality of L shaped valve clamping means slidably mounted on said frame and adapted to engage the flange portion of said valves;
(e) rack gear means mounted on said clamping means;
(f) sector gear means pivotally mounted on said frame member and adapted to engage said rack gear teeth whereby rotation of said sector gear means when rotated will urge said clamping means into or out of engagement with the flange of said valve;
(g) a plurality of second fluid motor means pivotally mounted between said frame and said gear sectors;
(h) fluid means connecting each of said plurality of second motor means wherein application of fluid will rotate said sector gears;
(i) a second fluid means connecting to said first fluid motor for pressure sealing said valve; and
(j) a third fluid means applied through said disc-shaped valve seat member for applying testing pressure to said valve.

References Cited in the file of this patent

UNITED STATES PATENTS

| | | |
|---|---|---|
| 971,191 | Gray | Sept. 27, 1910 |
| 1,298,236 | McKenzie | Mar. 25, 1919 |
| 1,472,235 | Abbott | Oct. 30, 1923 |
| 1,787,509 | Campbell | Jan. 6, 1931 |
| 3,088,312 | Morris | May 7, 1963 |

FOREIGN PATENTS

| | | |
|---|---|---|
| 193,122 | Austria | Nov. 25, 1957 |